(12) United States Patent
Hanselman

(10) Patent No.: US 9,981,809 B2
(45) Date of Patent: May 29, 2018

(54) ACCUMULATOR DEVICE FOR DYNAMICALLY ACCUMULATING CONVEYED PRODUCTS, AS WELL AS A METHOD FOR USING SUCH A DEVICE

(71) Applicant: Polyketting Holding B.V., Zelhem (NL)

(72) Inventor: Marcel Hanselman, Zelhem (NL)

(73) Assignee: Polyketting Holding B.V., Zelhem (NL)

( * ) Notice: Subject to any disclaimer, the term of this patent is extended or adjusted under 35 U.S.C. 154(b) by 0 days. days.

(21) Appl. No.: 15/526,777

(22) PCT Filed: Nov. 11, 2015

(86) PCT No.: PCT/NL2015/050793
§ 371 (c)(1),
(2) Date: May 15, 2017

(87) PCT Pub. No.: WO2016/080826
PCT Pub. Date: May 26, 2016

(65) Prior Publication Data
US 2017/0341877 A1    Nov. 30, 2017

(30) Foreign Application Priority Data
Nov. 17, 2014   (NL) ..................................... 2013820

(51) Int. Cl.
*B65G 47/51* (2006.01)
*B65G 15/02* (2006.01)

(52) U.S. Cl.
CPC ......... *B65G 47/5131* (2013.01); *B65G 15/02* (2013.01); *B65G 2201/02* (2013.01)

(58) Field of Classification Search
CPC .... B65G 15/02; B65G 47/5131; B65G 47/52; B65G 2201/02
(Continued)

(56) References Cited

U.S. PATENT DOCUMENTS 5,624,021 A * 4/1997 Novak ...................... B08B 9/46
198/604
5,772,005 A * 6/1998 Hansch .............. B65G 47/5131
198/594
(Continued)

FOREIGN PATENT DOCUMENTS

EP        2039626 A1    3/2009
JP        02270716 A    11/1990
(Continued)

*Primary Examiner* — Leslie A Nicholson, III
*Assistant Examiner* — Keith R Campbell
(74) *Attorney, Agent, or Firm* — NLO N.V.; Catherine A. Shultz; Lindsey A. Auerbach

(57) ABSTRACT

An accumulator device includes an infeed conveyor with an endless conveying belt arranged for moving products in a first conveying direction, a substantially parallel outfeed conveyor with an endless conveying belt arranged for moving products in a second, opposing conveying direction, a transfer device provided in-between the infeed and outfeed conveyors, configured for transferring products from the infeed conveyor to the outfeed conveyor. The transfer device is moveable along the infeed and outfeed conveyors, and includes first and second transfer elements with first and second gripping devices for engaging the products and transporting along the transfer trajectory to a release location on the outfeed conveyor.

16 Claims, 4 Drawing Sheets

(58) Field of Classification Search
USPC .................................. 198/347.1, 347.2, 594
See application file for complete search history.

(56) References Cited

U.S. PATENT DOCUMENTS

| | | | | |
|---|---|---|---|---|
| 6,152,291 A * | 11/2000 | Steeber | ............. | B65G 47/5131 198/594 |
| 6,230,874 B1 * | 5/2001 | Steeber | ................. | B65G 15/60 198/457.06 |
| 6,260,688 B1 * | 7/2001 | Steeber | ................. | B65G 21/18 198/347.4 |
| 6,382,398 B2 * | 5/2002 | Steeber | ................. | B65G 21/18 198/594 |
| 6,612,420 B1 * | 9/2003 | Hartness | ............ | B65G 47/5131 198/594 |
| 6,698,581 B2 * | 3/2004 | Steeber | ............. | B65G 47/5131 198/370.01 |
| 7,032,742 B2 * | 4/2006 | Hartness | ............ | B65G 47/5131 198/347.3 |
| 8,042,676 B2 * | 10/2011 | Balk | ................. | B65G 47/5131 198/347.1 |
| 8,469,181 B2 * | 6/2013 | Figarski | ................... | A24C 5/35 198/347.1 |
| 9,682,828 B2 * | 6/2017 | Beesley | ............. | B65G 47/5131 |
| 2003/0178284 A1 | 9/2003 | Steeber et al. | | |
| 2012/0132503 A1 | 5/2012 | Petrovic | | |
| 2014/0291121 A1 * | 10/2014 | Broers | ................ | B65G 47/5131 198/602 |
| 2016/0325943 A1 * | 11/2016 | Beesley | ................. | B65G 37/00 |

FOREIGN PATENT DOCUMENTS

| | | |
|---|---|---|
| NL | 2010932 C | 12/2014 |
| WO | 2007123401 A1 | 11/2007 |

* cited by examiner

ACCUMULATOR DEVICE FOR DYNAMICALLY ACCUMULATING CONVEYED PRODUCTS, AS WELL AS A METHOD FOR USING SUCH A DEVICE

FIELD OF THE INVENTION

The present invention relates to an accumulator device for dynamically accumulating conveyed products comprising:
- an infeed conveyor with an endless conveying belt arranged for moving products in a first conveying direction, at a first speed,
- an substantially parallel outfeed conveyor with an endless conveying belt arranged for moving products in a second, opposing conveying direction, at a second speed,
- a transfer device provided in-between the infeed and outfeed conveyors, configured for transferring products from the infeed conveyor to the outfeed conveyor, the transfer device being moveable along the infeed and outfeed conveyors, at a third speed.

BACKGROUND OF THE INVENTION

Such an accumulator table with a transfer device is known from US 2012/0132503 A1. This patent publication describes a table for accumulating items with two planar inlet and outlet conveyors. A diverting member is placed in-between the inlet and outlet conveyor for transferring items from the inlet conveyor to the outlet conveyor. The diverting member is shaped as a curved wall arranged on a longitudinally moveable carriage. The wall extends over substantially the whole width of the inlet conveyor.

A disadvantage of the transfer device disclosed in US 2012/0132503 is that the diverting member is rather passive and merely redirects products or items pushed against the curved wall by the inlet conveyor. Apart from offering little control over the transfer process, the transfer process itself also proves to be rather chaotic. Products often get trapped inside the transfer device, e.g. causing jams near the curved wall, and products are often pushed onto the outlet conveyor in an erratic way, i.e. it is hard to predict what the arrangement of products will be on the outlet conveyor. Furthermore, due to the inlet conveyor being required to provide the kinetic energy for transferring the product from the inlet conveyor to the outlet conveyor, the inlet conveyor wears relatively fast.

It is therefore an object of the present invention to provide an accumulator table with a transfer device, wherein control over the transfer process is improved.

It is a further object of the invention to provide an accumulator table that prevents products from getting trapped inside the transfer device.

It is another object of the invention to provide an accumulator table with a transfer device, wherein the arrangement of products on the outlet conveyor can be accurately predicted.

It is yet a further object of the invention to provide an accumulator table, wherein the orientation of the products remains the same after transfer by the transfer device.

It is an even further object of the invention to provide an accumulator table, wherein the products do not impact on each other during transfer.

SUMMARY OF THE INVENTION

Hereto, the accumulator table according to the invention is characterized in that the transfer device comprises:
- a first transfer element having a first horizontal circumference provided with first gripping means for horizontally engaging the products,
- a second transfer element, horizontally spaced-apart from the first transfer element, having a second horizontal circumference provided with second gripping means for horizontally engaging the products in cooperation with the first gripping means, wherein, during use, between the first and second circumference a transfer trajectory is defined, along which a distance (D) between the first and second circumference, perpendicular to the transfer trajectory, is substantially constant and along which the first and second gripping means are arranged to be driven in a same transfer direction, such that a product can be gripped by the first and second gripping means at a gripping location on the infeed conveyor and transported along the transfer trajectory to a release location on the outfeed conveyor.

The above-described accumulator table provides increased control over the transfer process, due to the transfer device functioning independently from the infeed and outfeed conveyors. The transfer speed of the first and second gripping means can be changed, for instance, providing additional control options. The first and second gripping means preferably engage the products by friction.

The active transfer of products by driven gripping means furthermore prevent products from getting trapped at the entry point of the transfer device on the infeed conveyor. Additionally, due to the distance (D) being constant along the transfer trajectory, the products are prevented from inadvertently changing orientation. Furthermore, during transfer the products are prevented from impacting on each other due to the products not having a relative speed with respect to each other.

Moreover, the active transfer of products prevents unnecessary wear of the infeed conveyor.

In an embodiment of the accumulator device, the first gripping means comprise a first, driven endless carrier with gripping elements arranged to be driven along the first circumference. The endless carrier can comprise a chain or the like having a sequence of gripping elements.

Another embodiment relates to an accumulator device, wherein the second gripping means comprise a second, driven endless carrier with gripping elements arranged to be driven along the second circumference.

Another embodiment relates to an aforementioned accumulator device, wherein the first circumference has a circular shape and the second circumference has a matching C-shape along the transfer trajectory. Thus, essentially an arc-shaped transfer trajectory is formed. The circular shape allows the construction of the first transfer element to remain relatively simple.

In a preferred embodiment, the first gripping means comprise a so-called 'no-crush' wheel, wherein a circular rim of the wheel is arranged for engaging the products. The no-crush wheel improves resiliency, and therefore safety: when a person sticks his or her fingers in between a product and the gripping means, the no-crush wheel has sufficient resiliency to bounce back and not cause the person's fingers to get trapped or to otherwise get hurt. Furthermore, the no-crush wheel's relatively large resiliency allows for products having different diameters to be processed by the transfer device.

A further embodiment relates to an aforementioned accumulator device, wherein, during use, the first endless carrier can be driven at a fourth speed and the second endless carrier can be driven at a fifth speed to give a combined product transfer speed, wherein the fourth and fifth speeds can be varied, in order to vary the product transfer speed. In this way, the product transfer speed can be adapted, giving optimal control over the transfer process (i.e. in addition to being able to control the first, second and third speeds).

Preferably, the first and second endless carriers are provided with gripping elements each comprising a flexible fin extending away in perpendicular direction from the first and second circumference, respectively, having an upward angle with respect to the local transfer direction, such that at the gripping location the product is lifted from the infeed conveyor. Thus, dragging along of the product on the infeed conveyor is prevented. Such a gripping element is described in Dutch patent application NL 2010932 or international (PCT) patent application PCT/NL2014/050368 by the present applicant. The contents of the aforementioned patent applications are herewith incorporated by reference.

Another embodiment relates to an accumulator device, wherein the first and second gripping means are mechanically coupled to the infeed conveyor, such that the first and second gripping means are driven around the first and second circumference, respectively, by the infeed conveyor. Preferably, when the transfer device is moved along the infeed conveyor (i.e. when it is given a third speed different from zero), the speed of movement of the first and second gripping means is proportional to the difference between the first and the third speed, i.e. when the third speed equals the first speed, the difference will be zero and the first and second gripping means will be stopped from transferring products (i.e. the fourth and fifth speeds will be zero).

Another aspect of the invention concerns a method for using an aforementioned accumulator device, the method comprising the following steps:
    moving the products on the infeed conveyor to the transfer device in the first conveying direction, at the first speed,
    transferring the products from the infeed conveyor to the outfeed conveyor using the transfer device,
    moving the products on the outfeed conveyor away from the transfer device in the second conveying direction, at the second speed.

An embodiment relates to an aforementioned method, wherein the first speed is equal to the second speed, whereas the third speed is zero. In this mode, the accumulator table operates in conventional transfer mode, i.e. products are transferred one-on-one from the infeed conveyor to the outfeed conveyor. The spacing between subsequent products also remains the same.

Therein, the product transfer speed is preferably equal to the first and second speed.

An embodiment concerns an aforementioned method, wherein the transfer device is moved in the first conveying direction, wherein the third speed is equal to or higher than the first speed. In this way, transferring of products by the transfer device is essentially prevented and the supplied products are buffered on the infeed conveyor.

An advantageous embodiment relates to a method, wherein the transfer device is moved in the second conveying direction, wherein the third speed lies between zero and the second speed. Thus, it is possible to decrease the spacing between products on the outfeed conveyor compared to the spacing of the products on the infeed conveyor.

A further embodiment relates to an aforementioned method, wherein the transfer device is moved in the first conveying direction, wherein the third speed lies between zero and the first speed. Analogous to the foregoing paragraph, it is possible to increase the spacing between products on the outfeed conveyor compared to the spacing of the products on the infeed conveyor.

Another embodiment relates to an aforementioned method, wherein the third speed is zero, wherein the first speed is different from the second speed. The transfer device according to the invention can then be used advantageously to control variables like product spacing by varying the product transfer speed along the transfer trajectory.

A preferred embodiment relates to an aforementioned method, wherein the first speed is larger than the second speed wherein the transfer device is moved in the first conveying direction, wherein the third speed is equal to half the difference between the first and second speeds. This allows dynamic buffering without the products touching or hitting each other.

Similarly, the second speed can be larger than the first speed, wherein the transfer device is moved in the second conveying direction, wherein the third speed is equal to half the difference between the second and first speeds. This also allows dynamic buffering without the products touching or hitting each other.

BRIEF DESCRIPTION OF THE DRAWINGS

Embodiments of an aforementioned accumulator device and an aforementioned transfer device according to the invention will by way of non-limiting example be described in detail with reference to the accompanying drawings. In the drawings.

DETAILED DESCRIPTION OF THE INVENTION

Figure 1:
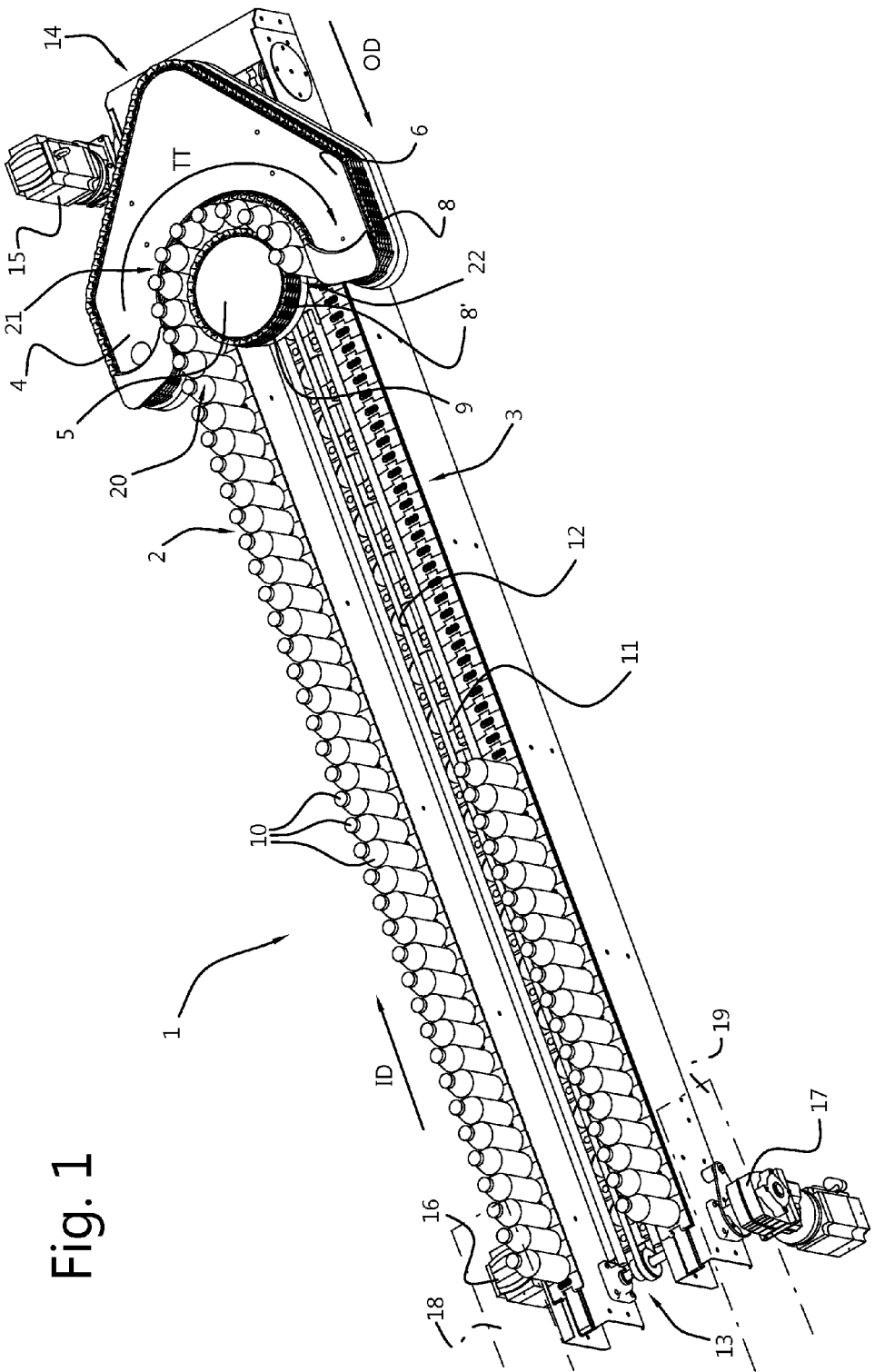
FIG. 1 shows a perspective view of an accumulator device provided with a transfer device according to the present invention.

FIG. 1 shows a perspective view of an exemplary embodiment of a conveyor device 1 according to the present invention, for use in a conveyor system (not illustrated). As shown on the left side of FIG. 1, the conveyor device 1 comprises an auxiliary infeed conveyor 18 arranged in an infeed direction ID. The infeed direction ID corresponds to the direction in which a product 10 is transported. An auxiliary outfeed conveyor 19 is provided at a distance from the auxiliary infeed conveyor 18. The auxiliary infeed and outfeed conveyors 18, 19 are arranged such that both conveyors are substantially parallel to each other. The auxiliary infeed conveyor 18 is connected to an infeed conveyor 2 similarly arranged in the infeed direction ID. The auxiliary outfeed conveyor 19 is connected to an outfeed conveyor 3 arranged in an outfeed direction OD. The infeed conveyor 2 is configured substantially parallel to the outfeed conveyor 3, forming a pair of opposing but parallel conveyors 2, 3. As shown, a transfer device 4 is situated in-between the infeed and the outfeed conveyor 2, 3. The transfer device 4 is movable in the infeed or outfeed direction ID, OD. The transfer device 4 as shown is guided along a supporting member 11 and more in particular, along a guiding opening 12 of the supporting member 11. The guiding opening 12 is in the form of an elongated guiding opening 12 extending substantially parallel to the infeed and outfeed conveyors 2, 3. The elongated guiding opening 12 is of such dimensions that the transfer device 4 can move from a first end part 13 of the supporting member, to a second end part 14 of the supporting member. The elongated guiding opening 12 may comprise limiting or stopping means for limiting the movement of the transfer device 4 in the infeed or outfeed direction ID, OD. A first speed is associated with the infeed conveyor, a second speed is associated with the outfeed conveyor and a third speed is associated with the movement of the transfer device in the elongated guiding opening 12.

The transfer device 4 comprises a first transfer element 5 and a second transfer element 6. The second transfer element 6 is arranged opposite to the first transfer element 5, forming a pair of transfer devices 5, 6. The first transfer element 5, hereafter also referred to as round element 5, has a circular shape, whereas the second transfer element 6 has a C-like shape. As shown, the C-like shape of the second transfer element 6 encompasses an outer circumference of the round element 5 such that a curved transfer trajectory TT with a substantially constant width D is formed there between. The skilled person will appreciate that the width between the C-like shape of the second transfer element 6 and the outer circumference of the rotating element 5 can be adjusted depending on the dimensions of the product 10 by replacing the first transfer element 5 by a rotating element 5 with a smaller or larger outer diameter.

The product as shown in FIG. 1 is a bottle, but it is not limited to a bottle. The skilled person will appreciate that the product 10 can be any type of container having any size and/or shape.

The transfer device 4 is configured for engaging the product 10 at a gripping location 20. The gripping location 20 is situated on the infeed conveyor 2. The product 10 is transported along a transfer trajectory TT. The product 10 is released at a release location 22, which is situated on the outfeed conveyor 3. The transfer trajectory TT of the transfer device 4 is situated in between the gripping location 20 and the release location 22 of the transfer device 4.

Figure 2:
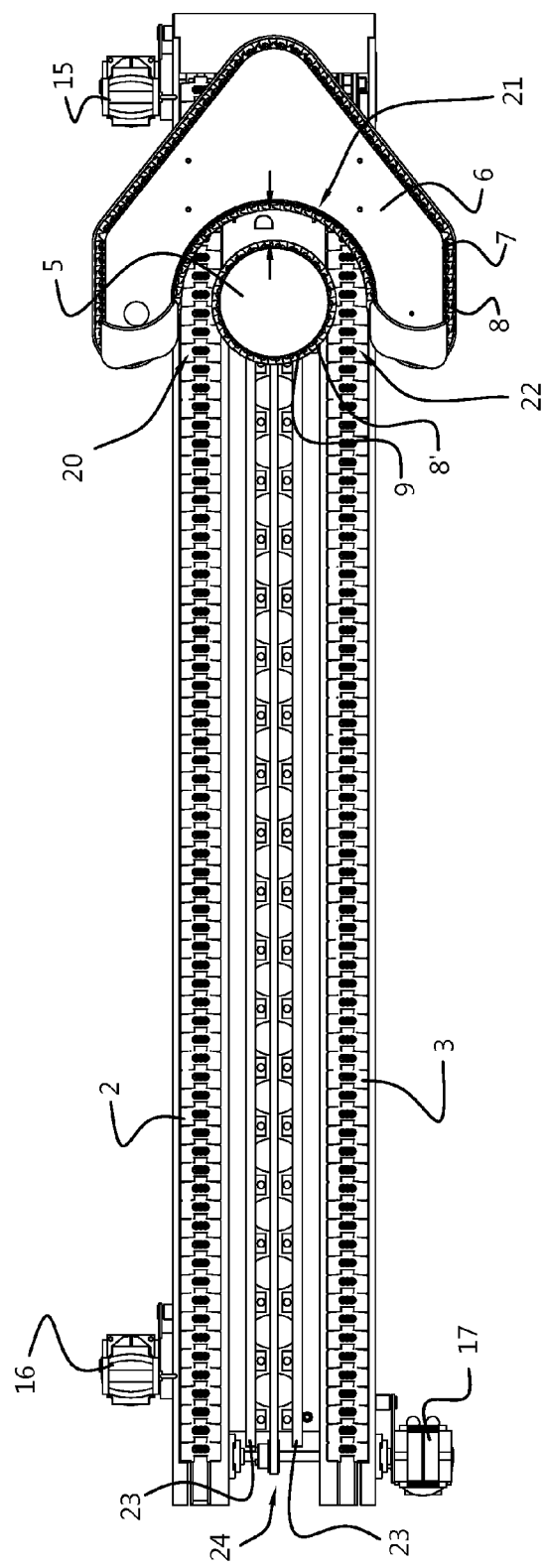
FIG. 2 shows a top view of the accumulator device provided with the transfer device according to the present invention.

The illustrated first and second transfer elements 5, 6 are each provided with first and second gripping means in the form of an endless carrier 8, 8' being configured to carry and support a plurality of consecutive griping elements 7, 9. The endless carrier 8, 8' may be formed by an endless belt, chain or the like, configured such that the endless carrier 8, 8' is connected to the outer circumference of the first and second transfer elements 5, 6. The endless carrier 8, 8' as shown in FIGS. 1 & 2 allow firm and/or flexible connection between each of the griping elements 7, 9 connected thereto. The shape and size of each of the gripping elements 7, 9 are determined by the physical dimensions of the product 10 to be transferred. The first transfer element 5 may also comprise a so-called no-crush wheel. This will be elucidated with reference to FIG. 3b.

As shown in FIG. 1, the infeed conveyor 2 is driven by a first drive motor 15. Moreover, a second drive motor 16 is located adjacent to a connection position wherein an auxiliary infeed conveyor 18 and the infeed conveyor 2 are connected together such that the infeed of product 10 is continuous from the auxiliary infeed conveyor 18 to the infeed conveyor 2. The second drive motor 16 provides movement to the auxiliary infeed conveyor 18. A third drive motor 17 is provided at the opposite side of the second drive motor 16 to provide power to the outfeed conveyor 3. Preferably, the movement of the first and second gripping means along the first and second circumference is indirectly driven by the first drive motor 15.

FIG. 2 shows a top view of the conveyor device 1 according to the present invention, wherein the top supporting member 11 has been removed. The illustrated view of the conveyor device 1 shows an elongated recess in-between the infeed and outfeed conveyors 2, 3, wherein a pair of guiding elements 23, in the form of rails, are shown.

Figure 3A:
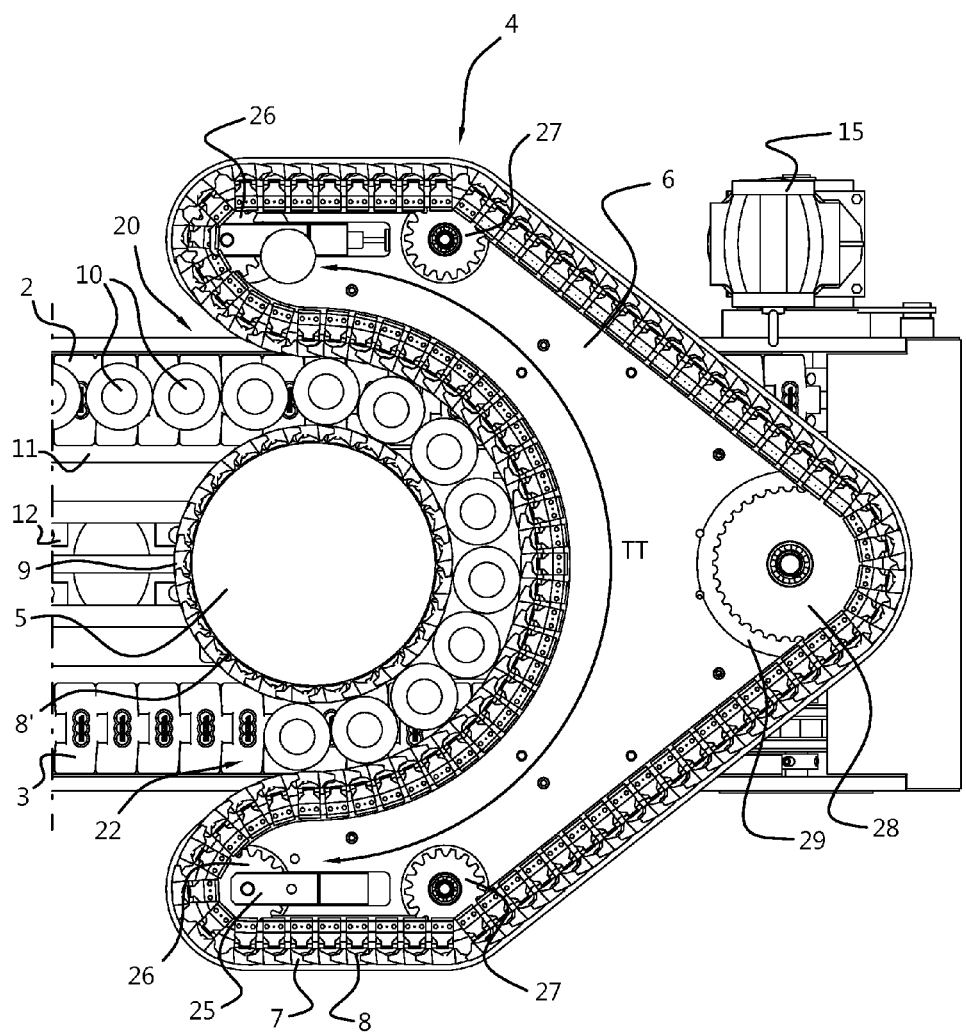
FIG. 3a shows a close-up view of the transfer device according to the present invention.

FIG. 3a shows a close-up view of the transfer device 4 wherein it can be appreciated that the product 10, here embodied as square shaped containers, is transported in the transfer direction TD on the infeed conveyor 2. The product 10 is fed into the transfer device 4 via the gripping location 20. Moreover, the product 10 is engaged, at the gripping location 20, by the gripping elements 7, 9 of the first or second transfer elements 5, 6, respectively. As shown, the product 10 is transported along the transfer direction trajectory TT, the product 10 being held in between the pair of facing gripping elements 7, 9. The product 10 is then released on the outfeed conveyor 3 at the release location 22.

As shown in FIG. 3a, the second transfer element 6 comprises gear wheels 26, 27, 28 on the inside, near each of the curved parts of the endless carrier 8. The gear wheels 26, 27, 28 directly engage the endless carrier 8 for providing movement to the gripping elements 9. The second transfer element 6 as shown comprises a pair of first gear wheels 26, a pair of second gear wheels 27 and third and fourth gear wheels 28, 29. The driving system of both the first and second endless carriers 8, 8' may be connected to the infeed conveyor, for instance via the above gearing system, such that the first and second endless carriers are essentially driven or powered by the infeed conveyor. Preferably, when the transfer device 4 is moved along the infeed conveyor 2 (i.e. when it is given a third speed different from zero), the speed of movement of the first and second gripping means is proportional to the difference between the first and the third speed, i.e. when the third speed equals the first speed the difference will be zero and the first and second gripping means will be stopped from transferring products. Preferably, a gearing system is provided that equalizes the tangential speeds of the first and second gripping means at a same location along the transfer trajectory, to prevent the product from being rotated around a vertical axis by the first and second gripping means during transfer. The gearing ratio will roughly proportionally correspond to the difference between the radius of curvature of the first gripping means and the radius of curvature of the second gripping means.

The second transfer element 6 having the C-like shape comprises a first gear wheel 26 in each of the C-like shape parts adjacent to the gripping and release locations 20, 22. As best seen in the lower part of FIG. 3a, the first gear wheel 26, being adjacent to the release location 22, comprises an actuator 25, here being embodied as a piston, connected to the gear wheel 26. The actuator 25 is connected to the first gear wheel 26 in such a way that the gear wheel 26 can freely rotate, and the actuator 25 can be operated in such a way that the respective curved part of the second transfer element 6 can be extended or tensioned.

Figure 3B:
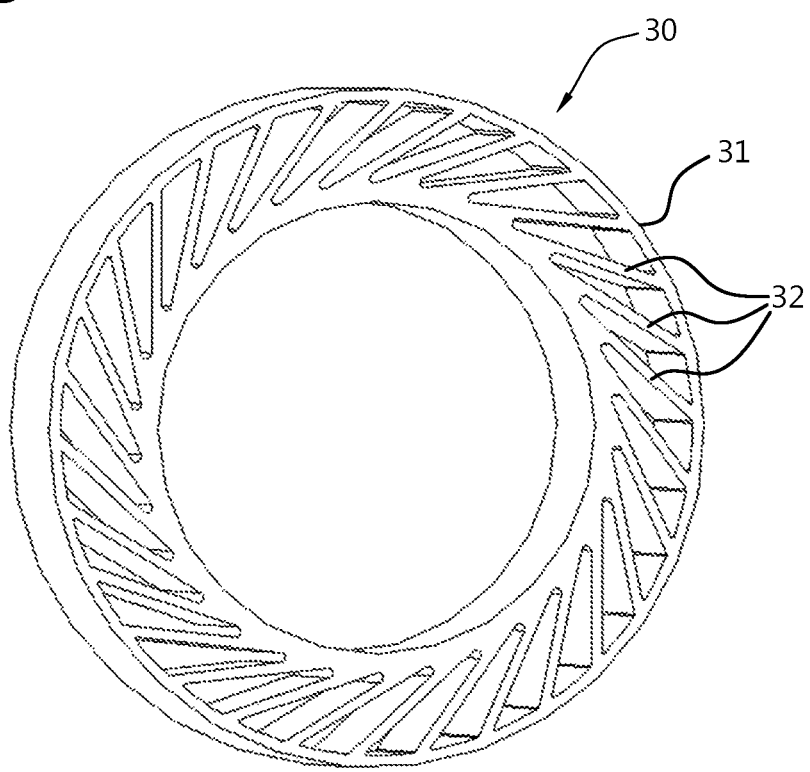
FIG. 3b shows a close-up view of the endless carriers of the accumulator device and the transfer device according to the present invention.

FIG. 3b shows a no-crush wheel 30 that can be used as the first transfer element 5 instead of a configuration with an endless carrier with gripping elements. The no-crush wheel 30 has a rim 31 for engaging the products 10 and resilient spokes 32 that give flexibility and resiliency to the rim 31.

Thus, the invention has been described by reference to the embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

LIST OF REFERENCE NUMERALS

1. Conveyor device
2. Infeed conveyor
3. Outfeed conveyor
4. Transfer device
5. First transfer element of the transfer device
6. Second transfer element of the transfer device
7. Gripping element of the first transfer element
8. Endless carrier of the second transfer element
8'. Endless carrier of the first transfer element
9. Gripping element of the second transfer element
10. Product
11. Supporting member
12. Guiding opening of the supporting member
13. First end part of the supporting member
14. Second end part of the supporting member
15. First drive motor for the infeed conveyor
16. Second drive motor for the infeed conveyor
17. Third drive motor for the outfeed conveyor
18. Auxiliary infeed conveyor
19. Auxiliary outfeed conveyor
20. Gripping location
21. Transfer location
22. Release location
23. Guiding elements
24. Clutch
25. Actuator/piston
26. First gear wheel
27. Second gear wheel
28. Third gear wheel
29. Fourth gear wheel
30. No-crush wheel
31. Rim of no crush wheel
32. Resilient element

The invention claimed is:

1. An accumulator device for dynamically accumulating conveyed products comprising:
    an infeed conveyor with an endless conveying belt arranged for moving products in a first conveying direction, at a first speed,
    a substantially parallel outfeed conveyor with an endless conveying belt arranged for moving products in a second, opposing conveying direction, at a second speed,
    a transfer device provided in-between the infeed and outfeed conveyors, configured for transferring products from the infeed conveyor to the outfeed conveyor, the transfer device being moveable along the infeed and outfeed conveyors, at a third speed, wherein the transfer device comprises:
    a first transfer element having a first horizontal circumference provided with first gripping means for horizontally engaging the products,
    a second transfer element, horizontally spaced-apart from the first transfer element, having a second horizontal circumference provided with second gripping means for horizontally engaging the products in cooperation with the first gripping means, wherein, during use, between the first and second circumference a transfer trajectory is defined, along which a distance between the first and second circumference, perpendicular to the transfer trajectory, is substantially constant and along which the first and second gripping means are arranged to be driven in a same transfer direction, such that a product can be gripped by the first and second gripping means at a gripping location on the infeed conveyor and transported along the transfer trajectory to a release location on the outfeed conveyor, wherein
    wherein the first and second gripping means are configured to have equalized tangential speeds along the transfer trajectory, and
    wherein the second transfer element comprises a first gear wheel in each C-shaped part of the second transfer element adjacent to the gripping and release location, and wherein each first gear wheel comprises an actuator configured to extend or tension a respective curved part of the second transfer element.

2. The accumulator device according to claim 1, wherein the first gripping means comprise a first, driven endless carrier with gripping elements arranged to be driven along the first circumference.

3. The accumulator device according to claim 1, wherein the second gripping means comprise a second, driven endless carrier with gripping elements arranged to be driven along the second circumference.

4. The accumulator device according to claim 1, wherein the first circumference has a circular shape and the second circumference has a matching C-shape along the transfer trajectory.

5. The accumulator device according to claim 4, wherein the first gripping means comprise a no-crush wheel, wherein a circular rim of the wheel is arranged for engaging the products.

6. The accumulator device according to claim 1, wherein, during use, the first gripping means is an endless carrier being driven at a fourth speed and the second gripping means is an endless carrier being driven at a fifth speed to give a combined product transfer speed, wherein the fourth and fifth speeds are varied, in order to vary the product transfer speed.

7. The accumulator device according to claim 1, wherein the first and second gripping means are endless carriers provided with gripping elements each comprising a flexible fin extending away in perpendicular direction from the first and second circumference, respectively, having an upward angle with respect to the local transfer direction, such that at the gripping location the product is lifted from the infeed conveyor.

8. The accumulator device according to claim 1, wherein the first and second gripping means are mechanically coupled to the infeed conveyor, and configured to be driven around the first and second circumference, respectively, by the infeed conveyor.

9. A method for using an accumulator device for dynamically accumulating conveyed products comprising an infeed conveyor with an endless conveying belt arranged for moving products in a first conveying direction, at a first speed, a substantially parallel outfeed conveyor with an endless conveying belt arranged for moving products in a second, opposing conveying direction, at a second speed, a transfer device provided in-between the infeed and outfeed conveyors, configured for transferring products from the infeed conveyor to the outfeed conveyor, the transfer device being moveable along the infeed and outfeed conveyors, at a third speed, wherein the transfer device comprises a first transfer element having a first horizontal circumference provided with first gripping means for horizontally engaging the products, a second transfer element, horizontally spaced-apart from the first transfer element, having a second horizontal circumference provided with second gripping means for horizontally engaging the products in cooperation with the first gripping means, wherein, during use, between the first and second circumference a transfer trajectory is defined, along which a distance between the first and second circumference, perpendicular to the transfer trajectory, is substantially constant and along which the first and second gripping means are arranged to be driven in a same transfer direction, such that a product can be gripped by the first and second gripping means at a gripping location on the infeed conveyor and transported along the transfer trajectory to a release location on the outfeed conveyor, wherein the third speed is zero, and wherein the first speed is different from the second speed, the method comprising the following steps:

a) moving the products on the infeed conveyor to the transfer device in the first conveying direction, at the first speed, b) transferring the products from the infeed conveyor to the outfeed conveyor using the first and second gripping means of the transfer device and equalizing tangential speeds of the first and second gripping means at a same location along the transfer trajectory, c) moving the products on the outfeed conveyor away from the transfer device in the second conveying direction, at the second speed.

10. The method according to claim 9, wherein the first speed is equal to the second speed, whereas the third speed is zero.

11. The method according to claim 9, wherein the product transfer speed is equal to the first and second speed.

12. The method according to claim 9, wherein the transfer device is moved in the first conveying direction, wherein the third speed is equal to the first speed.

13. The method according to claim 9, wherein the transfer device is moved in the second conveying direction, wherein the third speed lies between zero and the second speed.

14. The method according to claim 9, wherein the transfer device is moved in the first conveying direction, wherein the third speed lies between zero and the first speed.

15. The method according to claim 9, wherein the first speed is larger than the second speed wherein the transfer device is moved in the first conveying direction, wherein the third speed is equal to half the difference between the first and second speeds.

16. The method according to claim 9, wherein the second speed is larger than the first speed wherein the transfer device is moved in the second conveying direction, wherein the third speed is equal to half the difference between the second and first speeds.

* * * * *